Oct. 10, 1961  H. KLAUE  3,003,307
COMPOSITE POWER PLANT
Filed Oct. 19, 1956  7 Sheets-Sheet 4

Oct. 10, 1961    H. KLAUE    3,003,307
COMPOSITE POWER PLANT
Filed Oct. 19, 1956    7 Sheets-Sheet 5

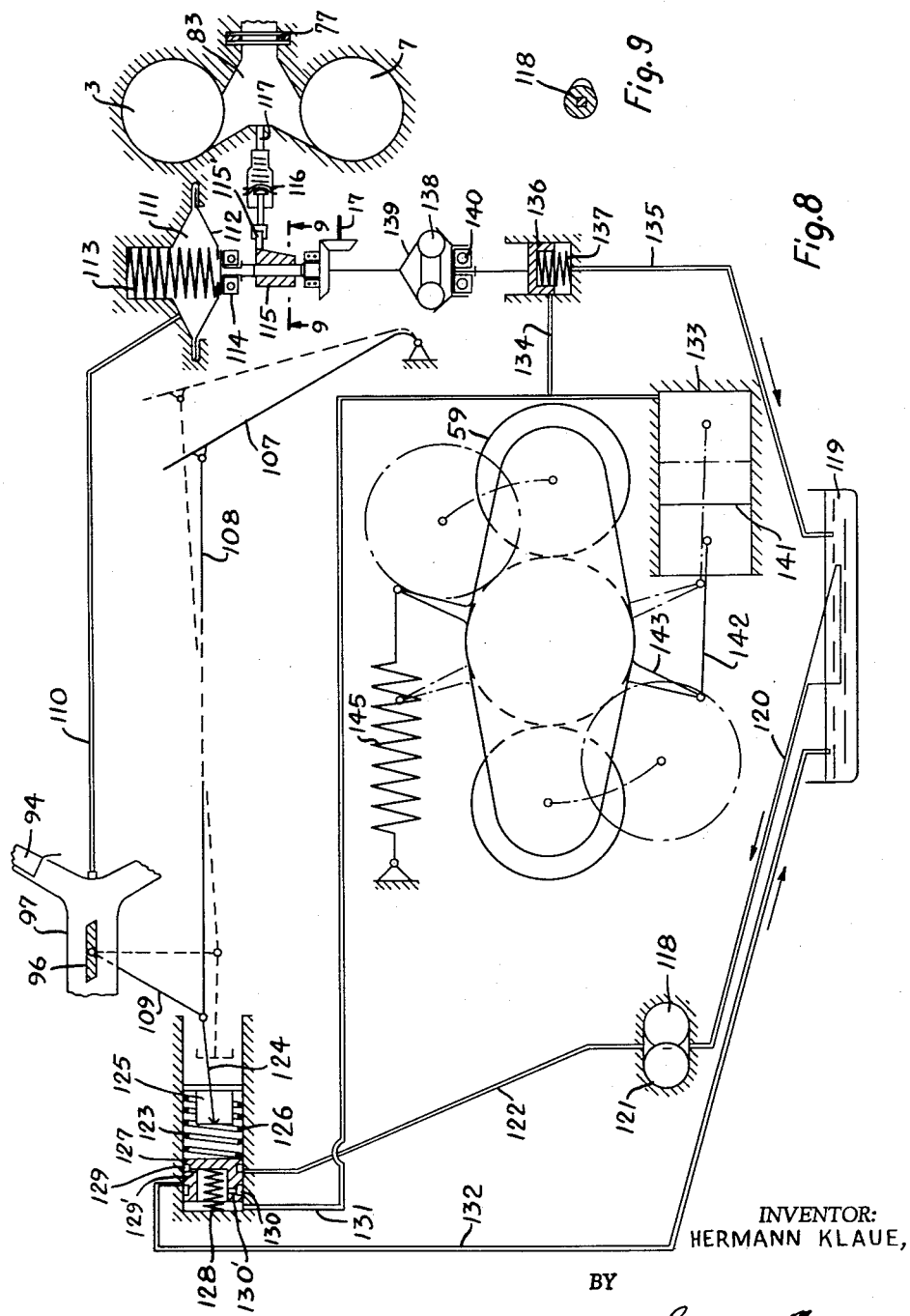

United States Patent Office 3,003,307
Patented Oct. 10, 1961

3,003,307
COMPOSITE POWER PLANT
Hermann Klaue, Uberlingen (Bodensee), Germany
Filed Oct. 19, 1956, Ser. No. 617,058
Claims priority, application Germany May 12, 1956
3 Claims. (Cl. 60—13)

The present invention relates to composite power plants, and more particularly to a power plant comprising a reciprocating internal combustion engine and an exhaust gas turbine.

Reference is made to my co-pending application Serial No. 566,285, filed February 17, 1956, now Patent No. 2,913,914, dated November 24, 1959.

It is known to utilize the exhaust energy of a piston or reciprocating internal combustion engine by means of a gas turbine. It has also been proposed to drive a charging blower or compressor by such an exhaust gas turbine, the compressor charging or supercharging the internal combustion engine, thereby to obtain an improvement in efficiency. With variations of the load the turbine co-operating with a conventional internal combustion engine is subjected to a contant variation of its speed of rotation. Accordingly, the energy of the exhaust gases cannot be utilized completely because the gas turbine has to be designed for a small load of the combustion engine. This applies particularly to two-stroke cycle engines where a certain charging pressure is required for the operation of the engine even if the load is small.

It is accordingly an object of the present invention to avoid this disadvantage by providing an internal combustion engine power plant which permits to design the exhaust gas turbine to utilize the full load exhaust pressure of the internal combustion engine so that the entire energy of the exhaust gases is efficiently utilized.

The exhaust gas turbine is to be assembled with the internal combustion engine in such a manner that the distance between the cylinders of the internal combustion engine and the exhaust gas turbine is as small as possible.

The solution of the problem according to the present invention consists therein that an internal combustion engine is used having a freely moving piston which is coupled through resilient members to a crankshaft or other output shaft revolving with a substantially constant speed in spite of variations of the load. This output shaft is rigidly coupled with the exhaust gas turbine by means of a gear train. The exhaust gas turbine is to be disposed below the lower pair of cylinders of the combustion engine so that the exhaust conduits starting from the middle portions of the cylinders discharge tangentially into the turbine housing or scroll. The exhaust gas turbine is designed as a radial flow turbine and is so dimensioned that for a partial load it covers the losses occasioned by the power requirements of a cooling blower or fan, the charging blower or compressor and other auxiliary equipment driven such, for example, as the oil pump and fuel injection pump, while for a full load the exhaust gas turbine yields additional useful power delivered to the output shaft and hence to the driving gear.

Further objects and advantages of the present invention will become apparent as the description proceeds in connection with the accompanying drawings illustrating by way of example an embodiment of the invention.

In the drawings:

FIG. 8 is a schematic view of the engine in accordance with the invention; and

FIG. 9 is a fragmentary sectional view taken on the line 9—9 of FIG. 8.

Figure 5:
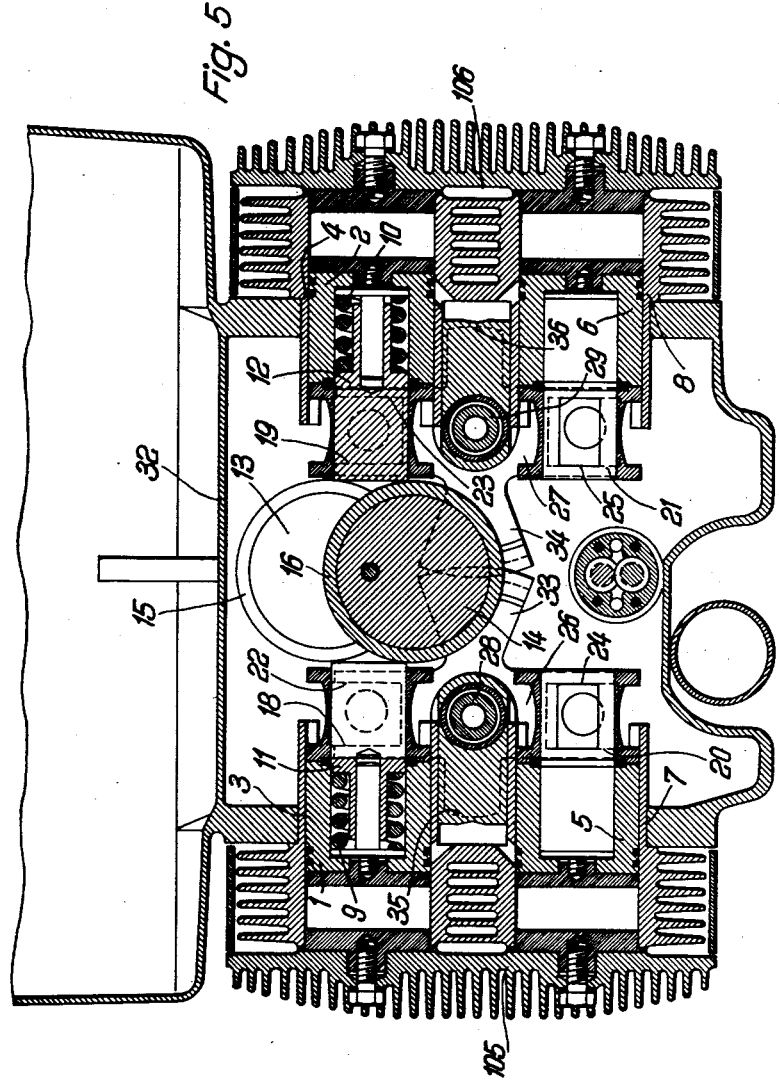
FIG. 5 is a further cross section taken along the line G—H of FIG. 2.
Figure 6:
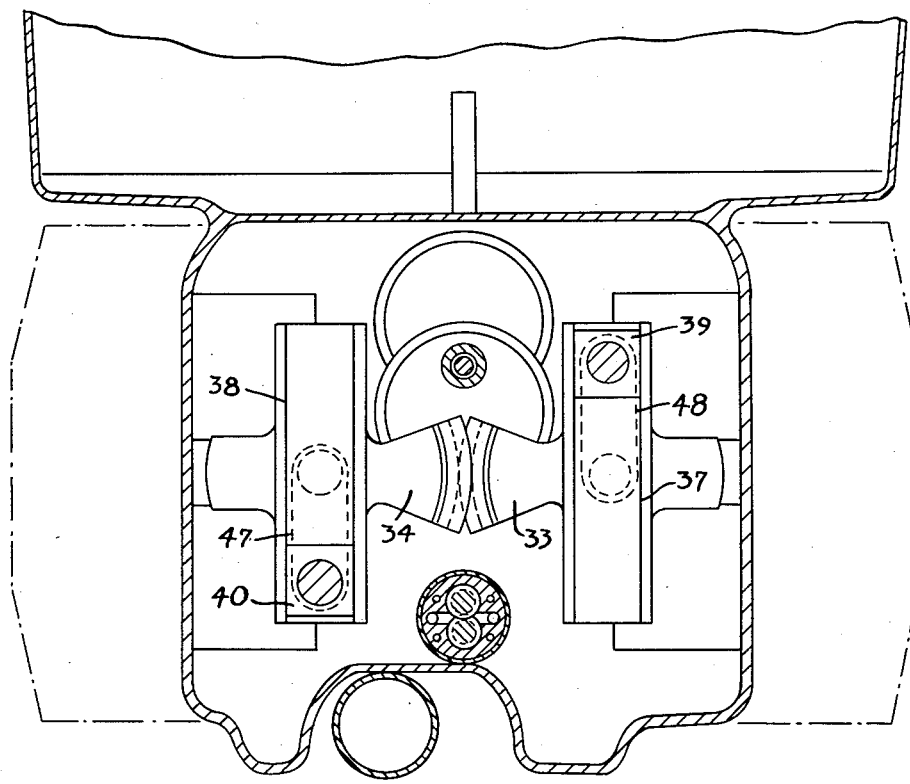
FIG. 6 is a sectional view taken on the line 6—6 of FIG. 3.

Referring now to the drawings, there are illustrated in FIG. 5 two upper pistons 1 and 2 arranged for sliding motion in cylinders 3 and 4, respectively. Two lower pistons 5 and 6 are arranged, respectively, for sliding motion in the cylinders 7 and 8. The cylinders, 3, 7 and the cylinders 4, 8 are provided in respective individual castings having cooling fins. The cylinder heads 106 and 105 close these cylinders.

The two upper pistons 1 and 2 are in power transferring connection with races 15, 16 disposed on eccentric cams 13, 14 of an output shaft 17 (see FIGS. 2 and 4) by means of the compression springs 9, 10 and the pressure pieces 11, 12. The pistons 1, 5 and 2, 6 are, respectively, in power transferring connection with the swinging levers 26 and 27 by means of the sliding members 18, 20 and 19, 21 slidable in grooves 22, 24 and 23, 25, respectively. The trunnions or pins 28, 29 of the swinging levers 26, 27 are unilaterally supported by means of needle or roller bearings 30 and 31 in the motor housing 32 (see FIG. 3).

As shown in FIG. 5, the swinging levers 26 and 27 are provided with toothed extensions 33 and 34, respectively, which engage each other. The extensions 35 and 36 serve the purpose of balancing the masses. The swinging levers are provided on their sides opposite the cylinders with grooves 37 and 38 (see FIG. 3) extending along the levers and which are engaged by means of sliding bodies 39 and 40 by the swinging cranks 46 and 47 supported by ball bearings 42, 43 and 44, 45 in the swingable yoke 41. This arrangement is such that a swinging movement of the yoke 41 causes an increase or a decrease of the angular movement of the swinging cranks 46 and 47 caused by the swinging levers 26 and 27.

The trunnions 48 and 49 of the swinging cranks 46, 47 are rigidly connected with the flanges 50 and 51. In grooves 52, 53 of these flanges 50 and 51 there are arranged respectively the ends of the spider or spring band couplings 54 and 55 transferring the torque received from the pistons to the drums 56 and 57. The drums 56 and 57 are connected through the gears 58 and 59 with the driving gear 60 and the driving shaft 61. Swinging movement of the yoke 41 may be effected by means of a worm spindle 62 engaging teeth 63 provided on the yoke 41 and by means of a toothed rack 64 which may be hydraulically displaced with respect to the teeth 65 of the worm spindle 62 (see FIG. 2).

It will now be evident that the force is transmitted from the pistons 1, 2 and 5, 6 by means of the swinging levers 26 and 27, the bodies 39 and 40 which are slidably disposed in the levers 26 and 27, the swinging cranks 46 and 47 which are disposed in the yoke 41 and which are connected to the bodies 39 and 40, respectively, the trunnions or pins 48 and 49 of the cranks 46 and 47, the flanges 50 and 51 rigidly connected with these pins 48 and 49, the spring band couplings 54 and 55, the drums 56 ad 57, the gears 58 and 59 and finally to the driving gear 60 and the driving shaft 61. Since the spring band couplings 54 and 55 provide a connection between the swinging crank 46 or 47, as the case may be, and the drum 56 or 57 in only one sense of rotation, the driving gear 60 and the driving shaft 61 is rotated in the manner of a ratchet connection. During an angle of rotation of 180° only the drum 56 with the associated gear 58 rotate and thereafter during the next 180° of rotation the drum 57 and the associated gear 59 rotate. Accordingly the spring band couplings 54 and 55 transmit the torque received from the pistons to the drums 56 and 57 with a phase shift of 180°.

Figure 7:
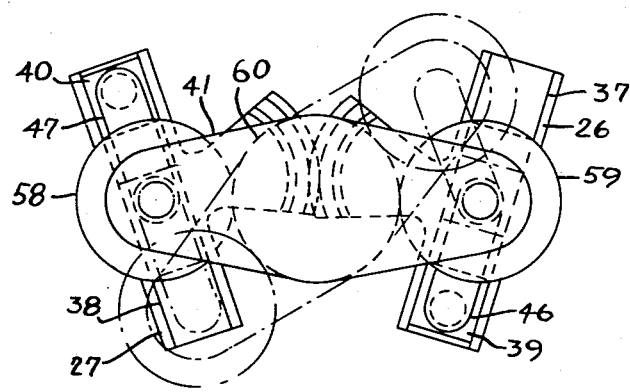
FIG. 7 is a schematic view seen in the direction of 6—6 of FIG. 3, but including an illustration of the yoke.

In FIG. 7, the yoke 41 is illustrated in solid lines in its position of maximum transmission. The bodies 39 and 40 have been slided by the yoke 41 to a position of greatest distance from the axes of rotation of the swinging levers 26 and 27, respectively, and the axes of the trunnions 48 and 49 coincide with the said axes of the said swinging levers. As the levers 26 and 27 swing, the gears 58 and 59 will receive from the cranks 46 and 47 maximum rotation impulses. The position of zero-transmission is shown for the yoke 41 in broken lines in FIG. 7; the bodies 39 and 40 have been moved by the yoke 41 to a position of coincidence with the said axes of rotation of the swinging levers 26 and 27, respectively, and transmit no movement to the gears 58 and 59.

Figure 2:
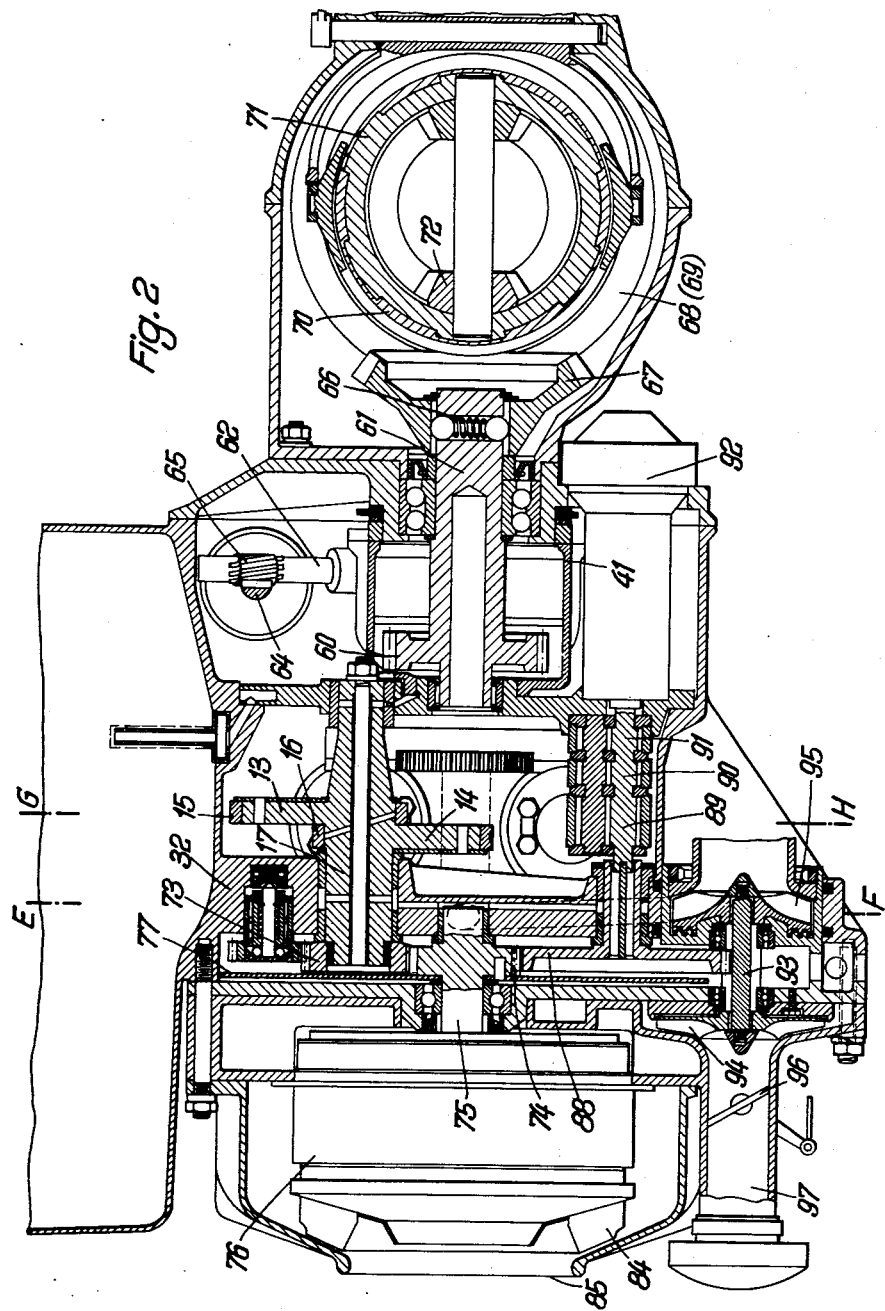
FIG. 2 is a longitudinal section of the power plant taken along the line A—B of FIG. 1.

The parts to be driven are powered by means of the shaft 61 through the intermediary of a safety clutch 66 and a driving bevel gear 67 driving two spur bevel gears 68 for the forward run and another spur bevel gear indicated at 69 but not illustrated in FIG. 2 (the bevel gear 69 is disposed vertically to the plane of FIG. 2) for the reverse run. The two bevel gears 68 and 69 are coupled in and out by means of a shift dog 70. The spur bevel gear 68 drives the differential casing 71 housing the differential gear 72 from which the wheels (not shown) of the vehicle are driven in a manner well known in the art.

The output shaft 17 revolves at a substantially constant speed and is driven as pointed out hereinbefore by means of the reciprocating pistons 1 and 2 bearing against the eccentric cams 13 and 14 respectively. Hence the speed of the output shaft 17 is independent of the continually changing speed of the drive shaft 61 which changes in dependence on the load. The output shaft 17 drives by means of the gears 73 and 74 (see FIG. 2) and the shaft 75 the light and starting generator 76 designed as a flywheel. On the shaft 75 there is also disposed a rotary inlet valve 77 designed as a flat dish-like valve controlling by its revolution the inlet of the gas or air into the cylinders of the internal combustion engine. For sealing purposes the pressure members 80 and 81 (see FIG. 3) are pressed against the rotary valve by the springs 78 and 79, the gas passing through the inlet channels 82 and 83 into the cylinders of the engine.

Figure 1:
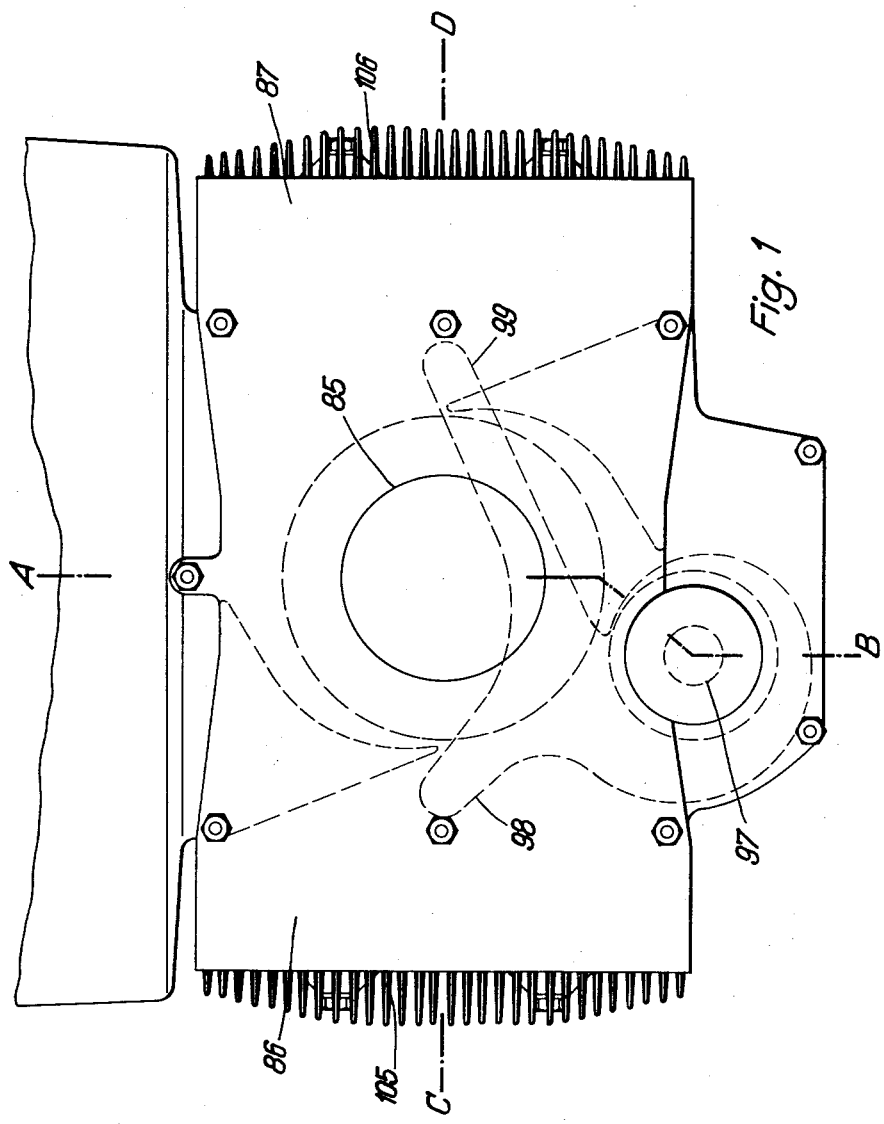
FIG. 1 is a front elevational view of an internal combustion engine power plant according to the present invention having two pairs of cylinders.

On the rotating casing of the light and starting generator 76 fan blades 84 are disposed for generating a flow of cooling air. The cooling fan 84 sucks in air through the opening 85 and conducts the air through ducts 86 and 87 (see FIG. 1) to the cooling fins of the engine cylinders, thereby to cool the cylinders.

The gear 74 on the shaft 75 is connected by means of the gear 88 with the shaft 93 supporting on the front side thereof the charging blower or compressor 94 and on the rear side thereof the radial turbine wheel 95 of the exhaust gas turbine. The gear 88 drives the gear pump 89, the pressure pump 90 for the circulating lubricant and the pressure pump 91 for actuation.

The charging blower or compressor 94 sucks in air from the suction duct 97 controlled by the throttle valve 96 and forces the charging or compressed air through the ducts 98 and 99 (see FIG. 1) to the rotary slide valve 77. The exhaust gas turbine 95 is connected with the outlet slots 100 and 101 (see FIG. 4) through the ducts 103 and 104 tangentially discharging into the casing or scroll 102 of the turbine.

The operation of the internal combustion engine power plant according to the present invention will now be described in connection with the interaction of the pistons coupled with the transmission gearing described hereinabove.

Figure 3:
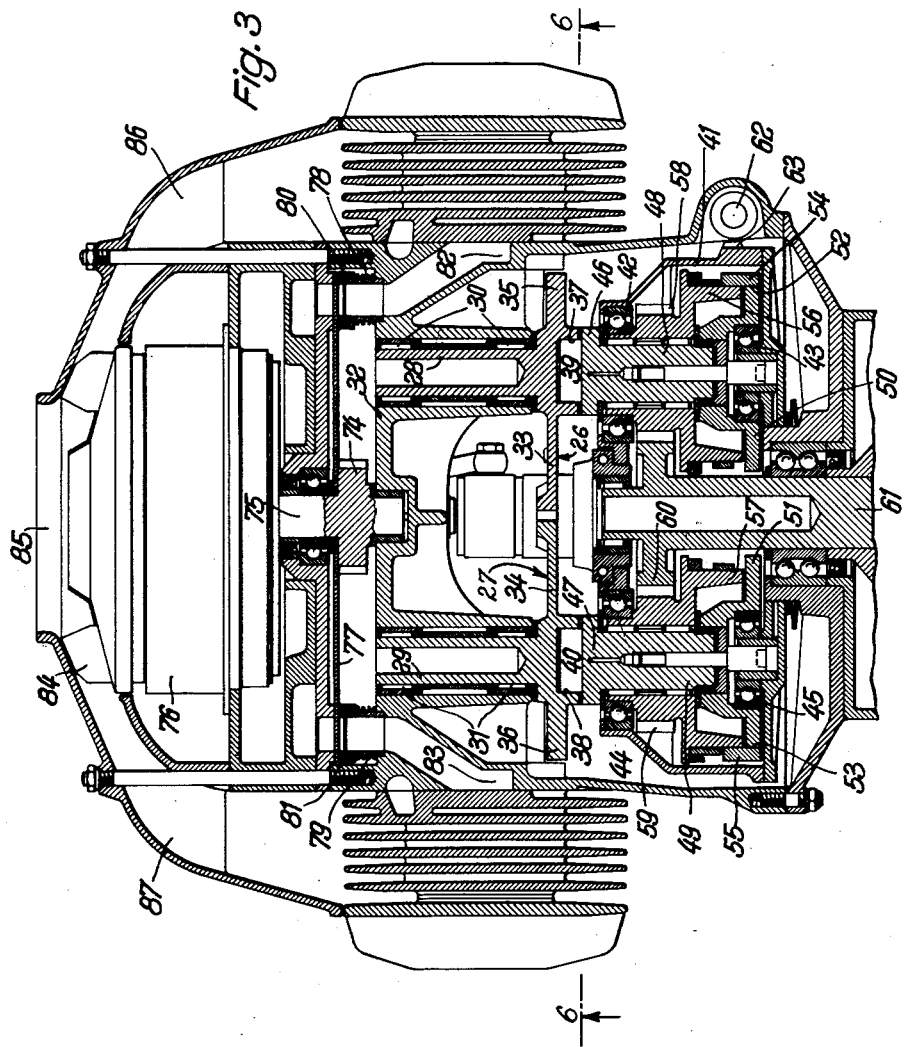
FIG. 3 is a sectional view normal to the section of FIG. 2 and taken along the line C—D of FIG. 1.
Figure 4:
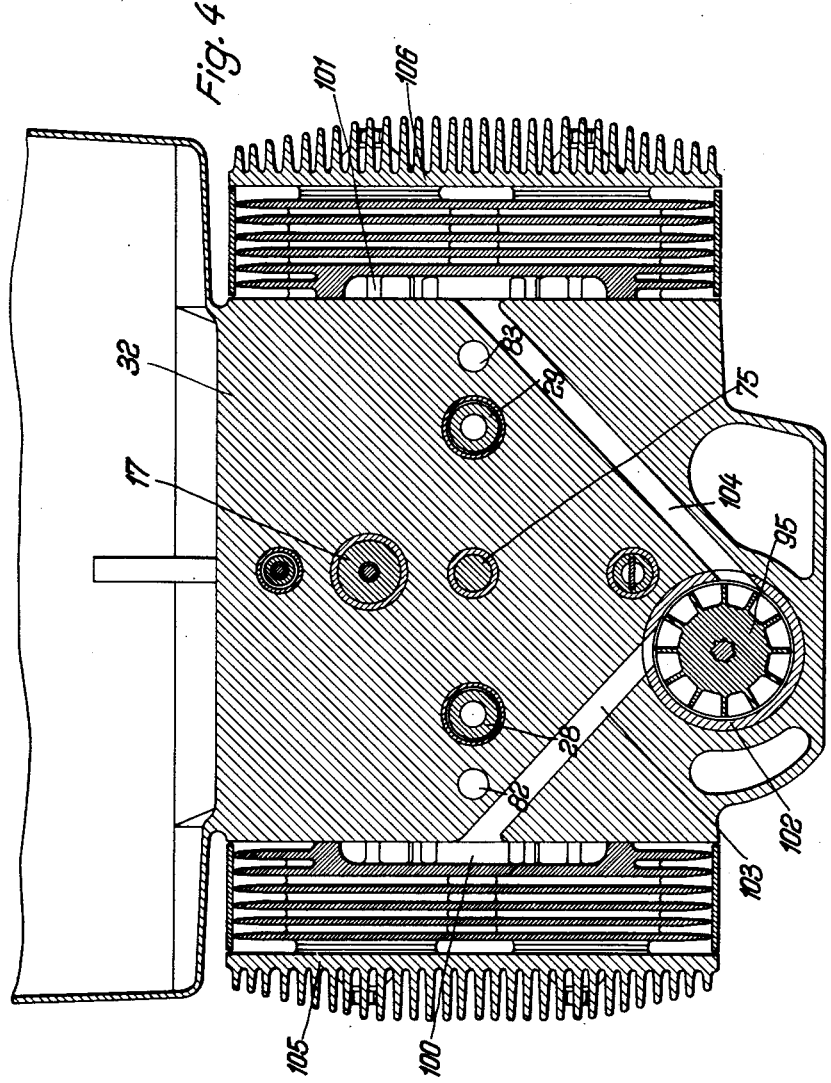
FIG. 4 is a cross section taken along the line E—F of FIG. 2.

The eccentric cams 13 and 14 rigidly secured to the output shaft 17 rotate in a counterclockwise direction as viewed in FIG. 5. As shown in FIG. 5 the pistons 1 and 2 carry out a compression stroke while the pistons 5 and 6 rigidly connected through the swinging levers 26 and 27 with the pistons 1 and 2 perform work. As soon as the upper edges of the pistons 5 and 6 reach the outlet slots, the exhaust gases enter from the exhaust slots 100 and 101 through the ducts 103 and 104 the turbine casing 102 so as to drive the exhaust gas turbine 95 (see FIG. 4). Only in the vicinity of the bottom dead center when the pressure in the cylinders is correspondingly lowered, the rotary valve 77 opens the inlet for the compressed gas (see FIG. 3). The air for the combustible mixture is precompressed by the compressor 94 (see FIG. 2) and may now flow into the cylinders through the inlet ducts 82 and 83 (FIG. 3).

Fuel is injected during the compression stroke. When the pistons 5 and 6 have compressed the mixture to such an extent that self-ignition occurs, the pistons 5 and 6 reverse their direction of motion whereupon a new working cycle begins. The same sequence of events takes place with a phase shift of 180° in the cylinders 3 and 4. The working pistons 1 and 2 are connected elastically or yieldingly with the output shaft 17 by means of the sliding bodies 11 and 12, the springs 9 and 10 and the eccentric cams 13 and 14. The output shaft 17 serves the purpose of driving the auxiliary devices.

At the same time the pistons 1 and 2 are coupled, on the other hand, by means of the sliding bodies 18 and 19 with the swinging levers 26 and 27 which are force connected to each other by means of the toothed extensions 33 and 34. The swinging levers 26 and 27 transmit the force developed by the pistons to the swinging cranks 46 and 47 by means of the sliding bodies 39 and 40 which are slidable in the grooves 37 and 38 of the swinging levers and have a position which is adjustable by swinging of the yoke 41. The swinging cranks 46 and 47 have pins or trunnions 48 and 49 which transmit the torque by means of their flanges 50 and 51 to the spring band couplings 54 and 55 which are shown in section only in FIG. 3. The spring band couplings 54 and 55 transmit the rotary torque alternately to the drums 56 and 57 which are coupled by means of the gears 58 and 59 to the driving gear 60 and finally to the driving shaft 61.

The throttle 96 (FIG. 8) in the suction conduit 97 of the pump 94, is controlled from and operated by the gas pedal 107, by means of a rod 108 and a lever 109. FIG. 8 shows (in solid lines) the position of these parts at "full speed," with the throttle 96 completely open; the position of these parts, however, is shown in broken lines for closure position of the throttle 96. The suction conduit 97 of the motor (not shown in FIG. 8) is connected, by means of a suction line 110 with a chamber 111 of the injection pump. A diaphragm 112 of said injection pump is controlled by a spring 113 in such a manner that the diaphragm 112 at the existence of but a small negative pressure will be moved by the spring 113 and will shift the nose 115 to full pump stroke position by means of a bearing 114. The nose 115 drives the fuel pump 116, by means of a roll 115'. Thereupon, the fuel pump 116 will inject fuel through a nozzle 117 into a conduit 83, which is controlled by the rotary inlet valve 77 (FIGS. 3 and 8). The conduit 83 interconnects the aforesaid pump 94 with the cylinders 3 and 7 of the motor. The nose 115 is shiftable axially, but rotates with a shaft 118 of square cross section (see FIG. 9); the shaft 118 is driven from the output shaft 17 (FIGS. 2, 8).

The hydraulic conduit for the change of transmission between the motor shaft and the driven shaft starts at an oil sump 119 from which oil is sucked through a suction conduit 120 by a gear pump 121 that is also driven from the shaft 118; from the gear pump 121, the oil is delivered through a conduit 122 to an oil pressure control valve 127 which is disposed in a control cylinder 123. The control valve 127 is connected to the rod 108 and lever 109, by means of a connecting rod 124 which is pivoted to a sliding member 125 and which is in driving connection with the valve 127 by means of a spring 126.

The valve 127 is open at one side and is hollow, and has two external grooves 129 and 130 which intercommunicate with the interior of the valve 127 by means of bores 129' and 130'. The edges of the grooves 129 and 130 control the inflow and outflow of the oil. A pressure spring 128 controls the retraction of the valve 127 to its normal position. The pressure that exists on the interior of the valve 127 corresponds to the pressure of the spring 126, and hence to the position of the gas pedal 107. The pressure which has been set by the positioning of the gas pedal 107 will be transmitted by a conduit 131 to a cylinder 133 of the control mechanism which mechanism, in turn, regulates the transmission position of the yoke 41. The overflowing oil flows back into the oil sump 119 through a conduit 132.

The oil sump 119 is connected to a conduit 131 by means of conduits 134 and 135. This serves to prevent a change of the transmission proportionally with the position of the pedal 107 at slow speeds and when great driving resistances occur. Between the conduits 134 and 135 there is provided a valve 136 which in the example of FIG. 8 interrupts the connection between the conduits 134 and 135.

When the motor has attained a predetermined rotational speed, the weights 138 of a governor will fly outwardly and will change the position of the valve 136, by means of oblique surfaces 139 of the governor and by means of a bearing 140. The position of the valve 136 is thus changed against the action of a valve spring 137. This is the position shown in FIG. 8. When the conduits 134 and 135 are thus disconnected from each other, oil can no longer return to the sump 119. The transmission will then change to a smaller ratio of transmission, until the weights 138 of the governor have been returned by the pressure of the spring 137 and by the resulting action of the surfaces 139, until the connection between the conduits 134 and 135 is established.

The yoke 41 in the embodiment of FIG. 8 may include a first extension 143 and a second extension 144. A spring 145 is connected to the second extension 144 to return the yoke to its normal position. The first extension 143 is connected by means of a rod 142 to a piston 141 of the hydraulic cylinder 133 of the control mechanism.

I claim:

1. A composite power plant comprising an internal combustion engine having two pairs of cylinders and a first shaft, individual pistons disposed in each of said cylinders for reciprocation thereof and operable to drive said first shaft with a substantially constant rotational speed regardless of variations of load, a swinging lever coupled to each pair of pistons, a tiltable yoke adapted to be displaced, said yoke being positioned adjacent said swinging levers, a pair of swinging cranks disposed in said yoke and displaceable therewith and in driven connection with said swinging levers, a second shaft, coupling means for rotating said second shaft alternately and sequentially by means of said cranks, an exhaust gas turbine, means establishing a conduit between said cylinders and said turbine, a pair of eccentric cams on said first shaft, yieldable means operable for driving said cams from said pistons thereby to rotate said first shaft, and gear means for connecting said first shaft to said turbine.

2. A composite power plant as defined in claim 1 wherein said turbine is disposed below one pair of said cylinders, and said conduit establishing means including exhaust ducts for connecting said cylinders to said turbine, said ducts and said turbine being disposed in such a manner that said ducts enter said turbine tangentially.

3. In a composite power plant, an internal combustion engine including two pairs of cylinders each having a reciprocable piston, said engine operating at a substantially constant frequency of piston reciprocation, a first shaft driven by said pistons at substantially constant rotational speed, a pair of interengaging swinging levers, each lever coupled to a pair of pistons, a pair of swinging cranks, each crank being in driving connecting with a swinging lever and swingable therewith about the axis of swinging of said swinging lever and shiftable relative to the swinging lever in opposite directions, a tiltable yoke connected to said swinging cranks and operable upon tilting to shift said cranks relative to the shifting levers to change the eccentricity of the cranks relative to said swinging axis thereby to vary in a stepless manner the impulses transmitted from said swinging levers to said swinging cranks, a second shaft, coupling means between said swinging cranks and said second shaft for imparting unidirectionally said impulses to said second shaft, thereby rotating said second shaft at stepless variable speeds, an exhaust gas turbine driven from said first shaft, means establishing a conduit between said cylinders and said turbine, an air compressor in driven connection with said turbine and duct means connecting said compressor to the intake of said engine.

References Cited in the file of this patent

UNITED STATES PATENTS

| | | |
|---|---|---|
| 1,345,530 | Carpenter | July 6, 1920 |
| 1,826,325 | Paul | Oct. 6, 1931 |
| 2,049,673 | Starr | Aug. 4, 1936 |
| 2,468,157 | Barlow et al. | Apr. 26, 1949 |
| 2,542,539 | Kuhrt et al. | Feb. 20, 1951 |
| 2,570,101 | Couling | Oct. 2, 1951 |
| 2,573,689 | Butler | Nov. 6, 1951 |
| 2,800,037 | Czuba et al. | July 23, 1957 |